United States Patent

Bouricius et al.

[15] 3,665,175

[45] May 23, 1972

[54] DYNAMIC STORAGE ADDRESS BLOCKING TO ACHIEVE ERROR TOLERATION IN THE ADDRESSING CIRCUITRY

[72] Inventors: Willard G. Bouricius, Katonah, N.Y.; William C. Carter, Ridgefield, Conn.; John P. Roth, Ossining; Peter R. Schneider, Peekskill, both of N.Y.

[73] Assignee: International Business Machines Corporation, Armonk, N.Y.

[22] Filed: Sept. 3, 1968

[21] Appl. No.: 757,002

[52] U.S. Cl. ....................235/153, 340/172.5

[51] Int. Cl. ....................G11c 29/00

[58] Field of Search ....................340/146.3, 172.5, 146.1; 235/153

[56] References Cited

UNITED STATES PATENTS 3,270,318 8/1966 Strawbridge....................340/146.1
3,387,262 6/1968 Ottaway et al....................340/172.5
3,560,924 2/1971 McBride....................340/172.5

*Primary Examiner*—Benjamin A. Borchelt
*Assistant Examiner*—H. A. Birmiel
*Attorney*—Lawrence R. Laubscher

[57] ABSTRACT

Mapping control means for achieving error toleration in computer addressing circuitry including switching means for connecting an address register with the effective address register of a basic operating module. The switching means are operable by a blocking register and at least one status register to control the mapping connections in a given manner. The invention is characterized by the provision of an address blocking register and a mask register that process a sequence of failed addresses and insert corresponding control instructions in the blocking and status registers so that the switching means dynamically excludes access to the memory area affected by the faulty address circuitry.

27 Claims, 13 Drawing Figures

INVENTORS
Willard G. Bouricius
William C. Carter
John P. Roth
Peter R. Schneider
BY Lawrence E. Laubscher
ATTORNEY Lawrence E. Laubscher
ATTORNEY BY Laurence E. Laubscher
ATTORNEY BY Lawrence E. Laubscher
ATTORNEY BY Lawrence E. Laubscher
ATTORNEY Patented May 23, 1972 3,665,175

10 Sheets-Sheet 7

BY Lawrence E. Laubscher
ATTORNEY

BY Lawrence B. Laubscher
ATTORNEY

Patented May 23, 1972 3,665,175

10 Sheets-Sheet 9

BY Lawrence E. Laubscher
ATTORNEY

BY Lawrence E. Laubscher
ATTORNEY

DYNAMIC STORAGE ADDRESS BLOCKING TO ACHIEVE ERROR TOLERATION IN THE ADDRESSING CIRCUITRY

One of the most error-prone parts of a computer is the main storage. Error correcting codes have been used to correct single bit failures, but such codes are of little help in correcting failures in the addressing circuitry.

The object of the present invention is to provide apparatus for dynamically blocking a storage address to achieve error toleration in the addressing circuitry, means being provided for automatically continuing use of many of the words in a main store after part of its addressing circuitry has failed so as to preclude correct accessing of a subset of the words. In accordance with the invention, the switching means connecting an address register with the effective address register of a basic operating module are controlled by a blocking register and at least one status register. An address blocking register and a mask register process a sequence of failed addresses (i.e., from zero to some indefinite number) and provide control instructions to said blocking and status registers to effect such a mapping by the switching means that the failed address is bypassed without interrupting the remaining computer operation.

A more specific object of the invention is to provide an error toleration system in which the masking register is operable to effect a comparison of those bit positions of a failed address contained in the address blocking register that correspond with positions containing 1's in the mask register. These comparison bits of the failed address in the address blocking register are then inserted in the blocking register, and the positions of successive 1's in the mark register are used to control the contents of corresponding status registers, respectively, associated therewith. More particularly, in the case of a system having $i$ status register, 1's are inserted into the $i^{th}$ register up to and including the bit position of the $i^{th}$ 1 in said mask register, the remaining bit positions of said $i^{th}$ status register containing 0's.

The foregoing and other objects, features and advantages of the invention will be apparent from the following more particular description of preferred embodiments of the invention, as illustrated in the accompanying drawing, in which.

Figure 1:
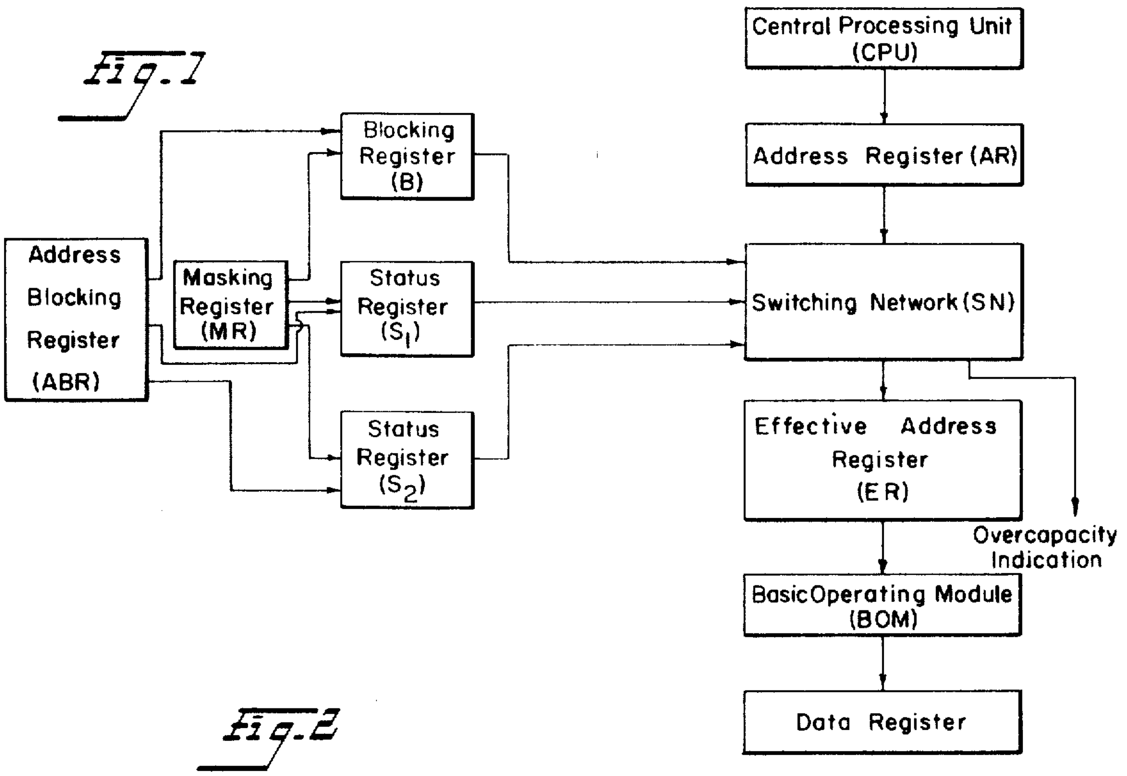
FIG. 1 is a block diagram of a computer addressing arrangement including the improved error toleration mapping control means of the present invention.

Referring to FIG. 1, the structure of the high availability store is organized around an existing basic operating module BOM to which an address is supplied from the central processing unit CPU via address register AR, switching network SN, and effective address register ER. As will be described below, the switching network is operable by control instructions in the blocking register B and the status registers S to make the connections from the address register AR to the effective address register ER in a given manner. In accordance with the present invention, the control instructions in the B and S registers are so derived from a failed address by an address blocking register ABR and a mask register MR that the mapping of the switching register will automatically by-pass the faulty address to preclude access to the specific storage area identified thereby.

The address blocking register ABR and the mask register MR are used to define each block of locations which is not to be addressed. Thus, when a faulty address is contained in the address blocking register ABR the contents of the mask register are used to control the comparison of the bits in the ABR. Assuming that the mask register MR contains 1's in the address bit positions for which a comparison is to be made and 0's elsewhere, then in those positions where the mask register is 1, the corresponding bit positions in the address blocking register ABR are tested for, and in those positions where MR is 0, ABR can contain any value.

For example, in a six bit address basic operating module, if $$ABR = 0\ 1\ 0\ 1\ 1\ 0$$
$$MR = 1\ 1\ 0\ 1\ 0\ 1$$

then the register pair defines the blocked locations to be those addresses specified by 0 1 X 1 X 0 i.e.

0 1 0 1 0 0
0 1 0 1 1 0
0 1 1 1 0 0
0 1 1 1 1 0 or address locations 20, 22, 28 and 30, respectively.

The switching means are directly controlled by the blocking register B — which contains as block definition bits the bits in the address blocking register that correspond with the bit positions containing 1's in the mask register — and by the contents of the status registers S. The number of status registers S correspond with the number of entries in the blocking register B. The address register AR, the effective address register ER, the address blocking register ABR, the mask register MR and the status registers S are all the same width, i.e., $q$ bits wide.

It is important to realize that when blocks are defined using this scheme, the address locations are not necessarily physically contiguous nor do they correspond with sequential addresses. They do, however, correspond with locations which would be logically grouped together by a failure in the addressing circuitry of a basic operating module. The number of such register pairs depends on the span of the address space and the desired reliability. As each becomes larger, more pairs become necessary.

The algorithm for determining the contents of the address blocking register and the mask register, after a failure, is defined recursively. When the first failed address is diagnosed it is placed in ABR and MR is set to all 1's. After the $K^{th}$ failure, K = 2, 3, 4, . . . MR is respecified to be $$MR \wedge (ABR = \text{FAILED ADDRESS})$$

while ABR becomes $$ABR \wedge \text{FAILED ADDRESS}.$$

The contents of the $i^{th}$ status register, $S_i$ is determined by the position of the $i^{th}$ 1 in MR (counting from $MR_1$ to $MR_q$). If this 1 occurs at $MR_k$ then, denoting the $j^{th}$ entry in $S_i$ by $S_{ij}$, $$S_{ij} = 1 \qquad j = 1, \ldots, k$$
$$S_{ij} = 0 \qquad j = k+1, \ldots, q.$$

If MR does not contain at least $i$ ones, $S_i$ is set to all zeros. Similarly bit $B_i$ in B, which corresponds to $S_i$, is set equal to $ABR_k$ where $k$ is as above. The next two sections show that using this particular method of defining $S_i$ and $B_i$ simplifies the address mapping algorithm and its associated circuitry.

Figure 2:
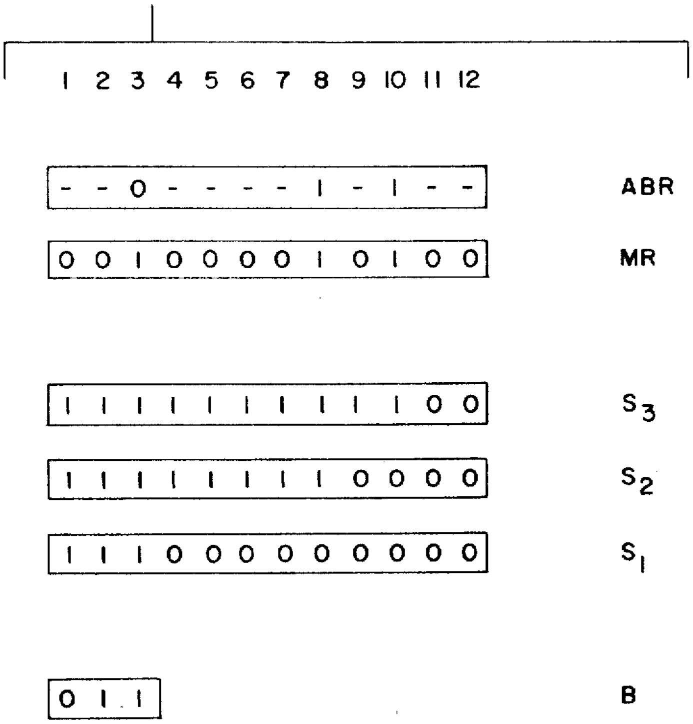
FIG. 2 is an instructional diagram illustrating the relationship between the contents of the address blocking register, the mask register, the status registers and the blocking register.

FIG. 2 shows a sample ABR and MR for a twelve bit address together with the $S_1$, $S_2$, $S_3$, and B generated from them. If more than three status registers existed, all $S_i$ for $i > 3$ would be set to zero.

The operation of the sequence for setting the status register means of a two status register system will now be described, reference being being made to FIGS. 3 to 5 and to the following clock pulse microprogram:

| Clock Pulse | Function |
|---|---|
| CL–1 | Reset HOLD—1 (temporary storage register) to all zeros<br>Reset HOLD—2 (temporary storage register) to all zeros<br>Test failure flip-flop F.F.<br>If on "0" → CL–2<br>If not on "0" → CL–8 |
| CL–2 | Set failure flip-flop to "1"<br>Gate ADDF to ABR<br>Set MR to all one's<br>→ CL–3 |
| CL–3 | Reset $S_1$ and $S_2$ to all zeros<br>Reset MR counter to all zeros<br>→ CL–4 |
| CL–4 | Test MR bit<br>If "0" and not in right hand bit<br>→ CL–5<br>If "1" → CL–7<br>If "0" and in R.H. bit →<br>interrupt for module not usable |
| CL–5 | Gate "1" to $S_1$ and $S_2$ bits<br>→ CL–6 |
| CL–6 | Increment MR Counter<br>→ CL–4 |
| CL–7 | Gate "1" to $S_1$ bit and to $S_2$ bit<br>Gate $ABR_k$ to $B_1$, $k$ is contents of MR counter.<br>→ CL–13 |
| CL–8 | Gate ADDF and ABR through bit by bit AND circuit to HOLD—1<br>→ CL–9 |
| CL–9 | Gate ADDF and ABR through bit by bit, Not Exclusive—OR (or Equivalence) circuit to HOLD—2<br>→ CL–10 |
| CL–10 | Gate HOLD—1 to ABR<br>→ CL–11 |
| CL–11 | Gate HOLD—2 and MR through bit by bit AND circuit to HOLD—1<br>→ CL–12 |
| CL–12 | Gate HOLD—1 to MR<br>→ CL–3 |
| CL–13 | Increment MR Counter<br>→ CL–14 |
| | Test MR bit<br>If "0" and not the R.H. bit<br>→ CL–15<br>If "L" → CL–17<br>If "0" and it is the R.H. bit →<br>interrupt for module not usable |
| CL–15 | Gate "1" to $S_2$ bit<br>→ CL–16 |
| CL–16 | Increment MR Counter<br>→ CL–14 |
| CL–17 | Gate "1" to $S_2$ bit<br>Gate $ABR_L$ to $B_2$, L is contents of MR counter.<br>→ Return to computer operation. |

Figure 3:
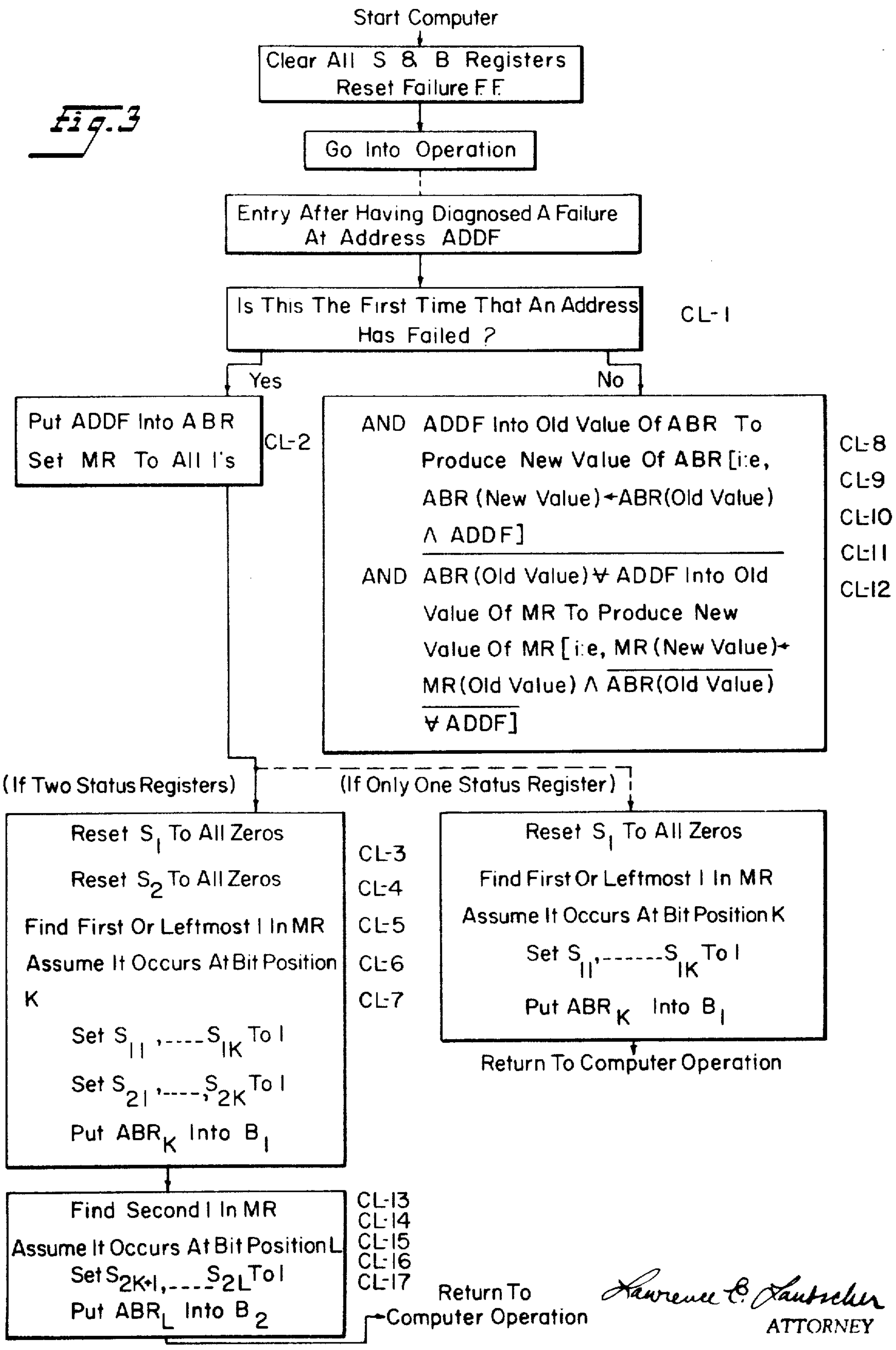
FIG. 3 is a sequence diagram illustrating the steps for setting the status register means.

Referring to FIG. 3 it will be noted that when the computer is initially started, the status registers $S_1$, $S_2$ and the blocking registers $B_1$, $B_2$ are cleared, and the "failure" flip-flop 112 (FIG. 4) is initially reset. Assuming that a failure is detected at address ADDF, this address is loaded into the ADDF register which is shown at the top of FIG. 4c. At a convenient time after the failure has been diagnosed, the pulse generator shown on FIG. 5 is started by applying a pulse to line 114. The multivibrators MV are of the single shot or monostable type and will be assumed to be in their "off" states. When a single shot such as 116 is turned "on" by applying the pulse to line 114, line 120 becomes active for a short period of time. This is referred to as "clock pulse-1" which is abbreviated CL1. When a single shot multivibrator, such as 118, goes "off" a short pulse is produced on wire 122 which goes through the OR circuit 124 in order to turn "on" the multibibrator which produces the clock pulse CL3.

It should be mentioned that this arrangement of multivibrators is used for illustrative purposes only. Any suitable form of pulse generator could be used.

Referring again to FIG. 4, the clock pulse CL1 is applied to gate 126 in order to test flip-flop 112. If flip-flop 112 is in its "0" state, line 100 becomes active. Line 100 extends to the pulse generator where it is effective to turn "on" the multivibrator which produces the clock pulse CL2. If flip-flop 112 is not on "0", then line 102 becomes active which causes the clock to branch to CL8. The CL1 pulse is also applied to lines 133 and 135 to reset the HOLD1 and HOLD2 registers to all 0's.

Figure 4:
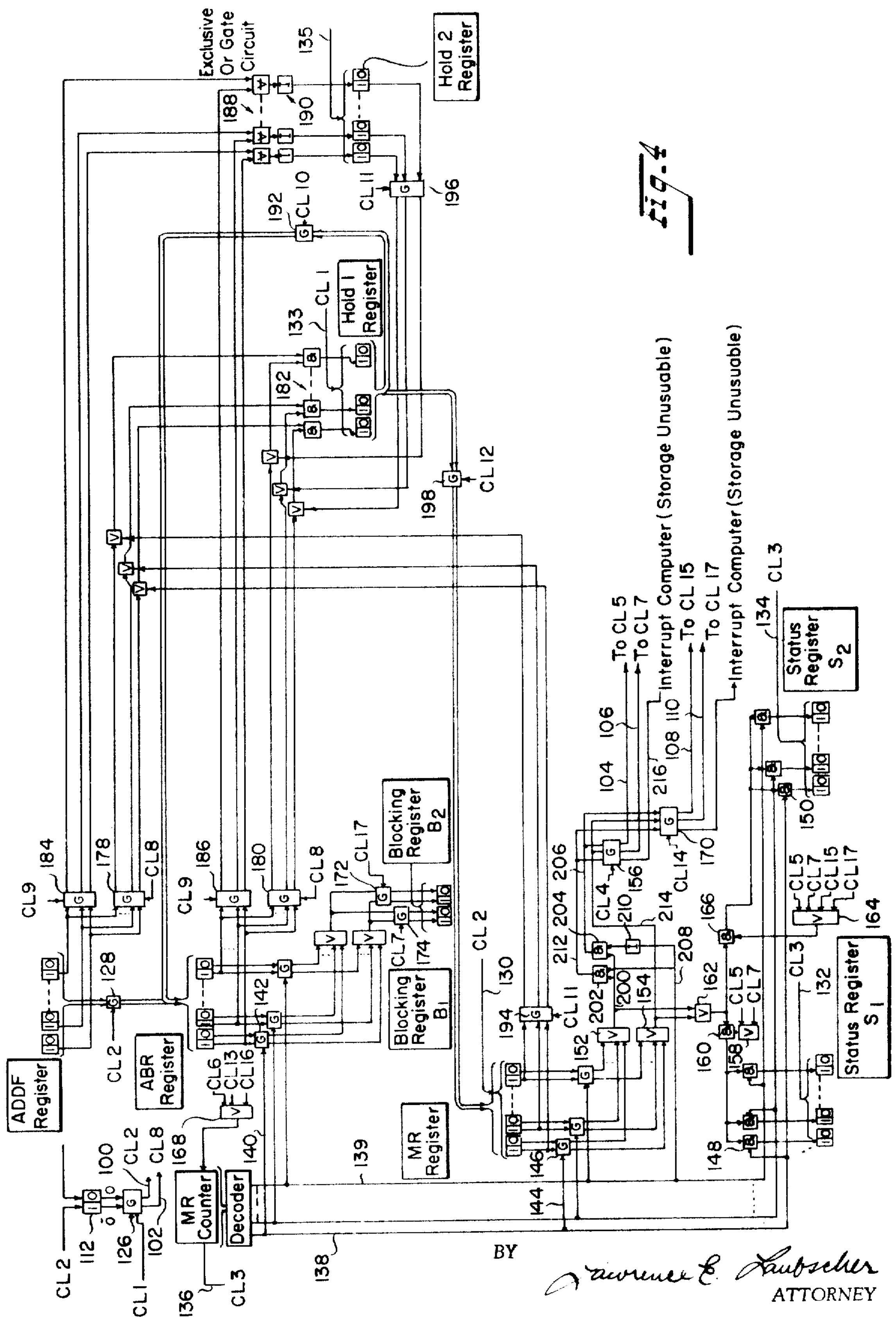
FIG. 4 is a schematic diagram of the ADDF register, address blocking register and mask register means for inserting control instructions in the status and blocking registers.

Assuming that flip-flop 112 is on "0", the CL2 pulse is applied to gate 128 (FIG. 4). This causes the contents of the ADDF register to be transferred to the ABR register. The CL2 pulse is also applied to line 130 in order to set the MR register to all 1's. The CL2 pulse is used to set the flip-flop 112 to its "1" state.

The clock advances to CL3, and the CL3 pulse is applied to lines 132 and 134 to set the $S_1$ and $S_2$ registers to all 0's. The CL3 pulse is also applied to line 136 to reset the MR counter to all 0's.

The clock advances to CL4. Because the MR counter is now on zero, line 138 becomes active to enable gate 142 via line 140, and to enable gate 146 via line 144. Furthermore, AND circuits 148 and 150 are enabled, and the MR counter "points" to the left hand bit of the ABR register, to the left hand bit of the MR register, to the left hand bit of the $S_1$ register, and to the left hand bit of the $S_2$ register.

In FIG. 4 it will be noted that the "0" side of a selected flip-flop in the MR register goes through OR circuit 152 and appears on line 200. Line 200 is applied to the AND circuits 202 and 204. If the selected bit in the MR register is a "0", and the MR counter does not "point" to the right hand bit of the MR register, the AND circuit 204 will have an output on line 206. This is because line 208 is not active until the MR counter "points" to the right hand bit of the MR register. As long as line 208 is inactive, the inverter circuit 210 will have an output in order to satisfy the AND circuit 204. When line 208 becomes active, it provides an input for AND circuit 202. In other words, if the bit in the MR register is a "0", and the bit is the right hand bit in the MR register, AND circuit 202 will have an output which appears on line 212. A selected bit in MR, which is a "1", will pass through OR circuit 154 and appear on line 214. When the three lines 212, 206 and 214 are sampled by the CL4 pulse applied to gate 156, one of the lines 104, 106 or 216 becomes active. If line 104 becomes active, the clock advances to CL5. If line 106 becomes active, the clock branches to CL7. If line 216 becomes active it causes the computer operation to be interrupted because the storage module is unusable. Lines 104 and 106 extend to the pulse generation means of FIG. 5.

When the clock advances to CL5, the CL5 pulse is applied to OR circuits 158 and 164 to enable the AND circuits 160 and 166 to gate "1's" to the bits of the $S_1$ and $S_2$ registers that are "pointed" to by the MR counter.

The clock then advances to apply the CL6 pulse to OR circuit 168 in order to increment the MR counter. The clock then reverts back to CL4. In the manner just described, "1's" are entered into the S registers until a "1" is encountered in the MR register. As mentioned above, when a "1" is encountered, the clock branches to apply the CL7 pulse to OR circuit 158 in order to gate a "1" into the bit position of $S_1$ register that is pointed to by the MR counter. The CL7 pulse is also applied to OR circuit 164 in order to gate a "1" into the same position of the $S_2$ register, and to gate 174 to gate to blocking register $B_1$ the bit in the ABR register that is pointed to by the MR counter.

In the illustrated two-status register system, the clock advances to apply CL13 to OR circuit 168 to increment the MR counter. If the system has only one status register, the output of the multivibrator which produces the CL7 pulse appears on lead 168 to cause the system to return to computer operation.

The clock then advances to apply CL14 to gate 170 to test the bit in the MR register that is "pointed" to by the MR counter. If this bit is a "0" and it is not the right hand bit, the clock will advance to CL15 via wire 108. If this bit is a "1", the clock will branch to CL17 via wire 110. If the bit is a "0"

and, if it is the right hand bit, an interrupt will be caused as explained previously. CL15 is applied to OR circuit 164 to gate a "1" to the bit in the $S_2$ register that is "pointed" to by the MR counter.

The clock advances to apply CL16 to OR circuit 168 in order to increment the MR counter. The clock then reverts back to CL14. When the second "1" is encountered in the MR register, the clock, as explained before, branches to apply CL17 to OR circuit 164 in order to gate a "1" to the bit in the $S_2$ register that is "pointed" to by the MR counter. CL17 is also applied to gate 172 to gate the bit in the ABR register that is "pointed" to by the MR counter to the $B_2$ flip-flop.

When the multivibrator that produces the clock pulse C17 goes "off", a signal is produced on wire 176 in order to return the system to computer operation.

It was explained previously that when flip-flop 112 is tested by the CL1 pulse, if flip-flop 112 is not on "0", the clock applies pulse CL8 to gates 178 and 180 in order to gate the ADDF register and the ABR register through the bit by bit AND circuits generally represented by the reference character 182 to the "HOLD 1" register.

The clock then advances to apply pulse CL9 to gates 184 and 186 in order to gate the contents of the ADDF register and the ABR register through the exclusive OR circuits generally designated by the reference character 188 and through the inverter circuits designated by the reference character 190 to the "HOLD 2" register.

The clock advances to apply pulse CL10 to gate 192 in order to gate the contents of the "HOLD 1" register to the ABR register.

The clock advances to apply pulse CL11 to gates 194 and 196 to gate the contents of the MR register and the "HOLD 2" register to the "HOLD 1" register through the bit by bit AND circuits generally designated by the reference character 182. The clock advances to apply pulse CL12 to gate 198 to gate the contents of the "HOLD 1" register to the MR register.

Figures 5, 6:
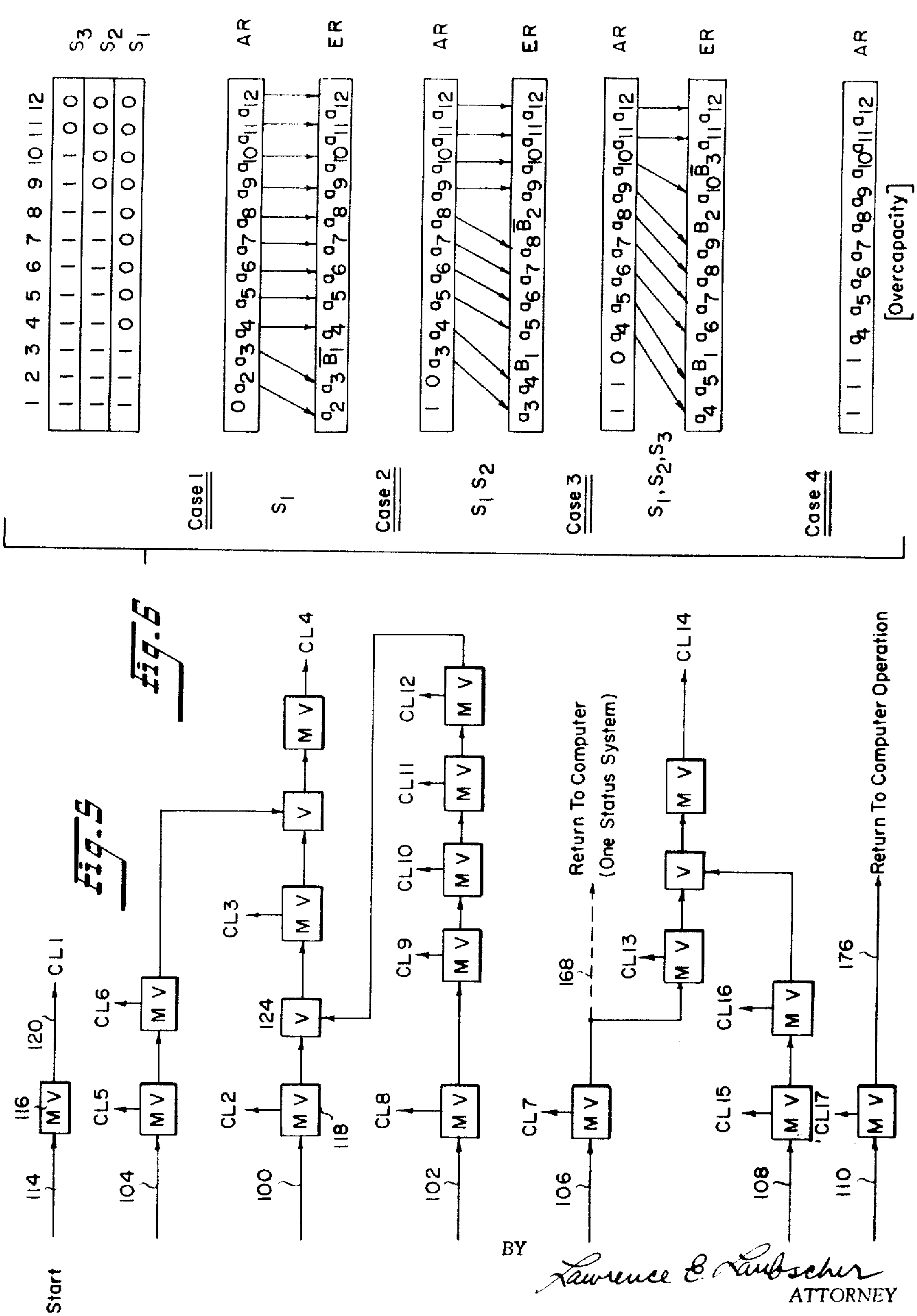
FIG. 5 is a schematic diagram of the means for generating the various clock pulses.
FIG. 6 and 7 are schematic diagrams illustrating various address mapping conditions achieved by the status and blocking registers.

FIG. 6 shows how the status registers are used to perform the mapping from AR to ER. In case 1 where $a_1 = 0$, the contents of $S_1$ are used to map input addresses from 0 to $2^{11} - 1$ to the unblocked locations specified by $xx\overline{B}_1xxxxxxxxx$. A one bit at position $S_{1k}$ means $a_k$ is to be shifted to $e_k-1$, and a 0 means $a_k$ goes directly to $e_k$. High order bits are shifted out and dropped. At the point where the transition from 1 to 0 occurs in $S_1$, i.e. where $S_{1k}\ \overline{S_{1k}+1} = 1$ (here at $k = 3$) the $\overline{B}_1$ value is inserted into $e_k$ in order to insure that ER is disjoint from the blocked locations. In case 2 where $a_1a_2 = 10$, addresses from $2^{11}$ to $2^{11}+2^{10} - 1$ are mapped into locations $xxB_1xxxx\overline{B}_2xxxx$ using $S_1$ and $S_2$. The amount each $a_k$ is shifted is now determined by the number of 1's in $S_{1k}$, $S_{2k}$ while the locations where $B_1$ and $\overline{B}_2$ are inserted is determined by the change of value points in $S_1$ and $S_2$ respectively. In case 3 where $a_1a_2a_3 =$ 110, these leading digits characterize the addresses ranging from $2^{11}+2^{10}$ to $2^{11}+2^{10}+2^9 - 1$ which $S_1$, $S_2$, and $S_3$ map to the unblocked addresses specified by $xxB_1xxxxB_2x\overline{B}_3xx$. The shifting and bit insertion follows an extension of the previous algorithm, bit shifting is determined by the number of ones in $S_1$, $S_2$, $S_3$ and bit insertion by the changes in value. In case 4 $a_1a_2a_3 = 111$, the address in AR is beyond the allowed range for the failed BOM so an overcapacity is indicated.

In the general case where $r$ status registers are available, the following algorithm prescribes their use. When no failures exist, all $S_i$ $i=1, \ldots, r$ are set to 0. Now assume a failure has occurred, MR has been defined, and that MR contains $n$ 1's. Let $m$ be the minimum of $n$ and $r$. Then all $S_i$ for $i>m$ are set to zero while the $S_i$ for $i>m$ are defined as prescribed above. The values of $B_1, \ldots, B_m$ are also specified as in the previous section; if $m<r$ then $B_i$, $i>m$ are arbitrary. When an address is entered into AR and the first $m$ bits are 1, an overcapacity is signalled. Otherwise, if $j$ is the length of the sequence of leading 1's, i.e. $a_1 \wedge \ldots \wedge \overline{a}_{j+1} = 1$, status registers $S_1, S_2, \ldots, S_{j+1}$ and bits $B_1, B_2, \ldots, B_{j+1}$ are used to perform the shifting and bit insertion. Again the length of the shift of $a_k$ is equal to the number of 1's in $S_{1i}, \ldots, S_{j+1i}$ and the point where bit B is inserted is at the location k where $S_{1k}\ \overline{S}_{1k+1} = 1$. Only the bit $B_m$ is inserted complemented. This algorithm will allow input addresses from 0 to $\left(\sum_{i=1}^{m} 2^{m-i}\right) - 1$ to be used in the BOM.

For a $q$ bit address $2^q$ word BOM, use of $S_1$ alone permits $2^{q-1}$ words to be available up until such time as enough failures occur so that MR contains no ones. If two registers $S_1$ and $S_2$ are used, it is possible to access $2^{q-1} + 2^{q-2}$ locations until MR contains exactly one 1, at which time $S_2$ is not used and only $2^{q-1}$ locations can be addressed. In general, if there are $r$ registers it is possible to access $\sum_{i=1}^{r} 2^{q-i}$ locations as long as there are $r$ ones in MR. It is important to realize that as the number of the registers increases the incremental investment in adding an extra register produces an exponentially decreasing incremental gain in addressable storage. For example, in an 8K BOM, $S_1$ allows 4K to be used after the first failure, adding $S_2$ allows 6K to be used, adding $S_3$ allows 7K to be used, etc. Thus, only a few such registers are employed in practice.

Figure 7:
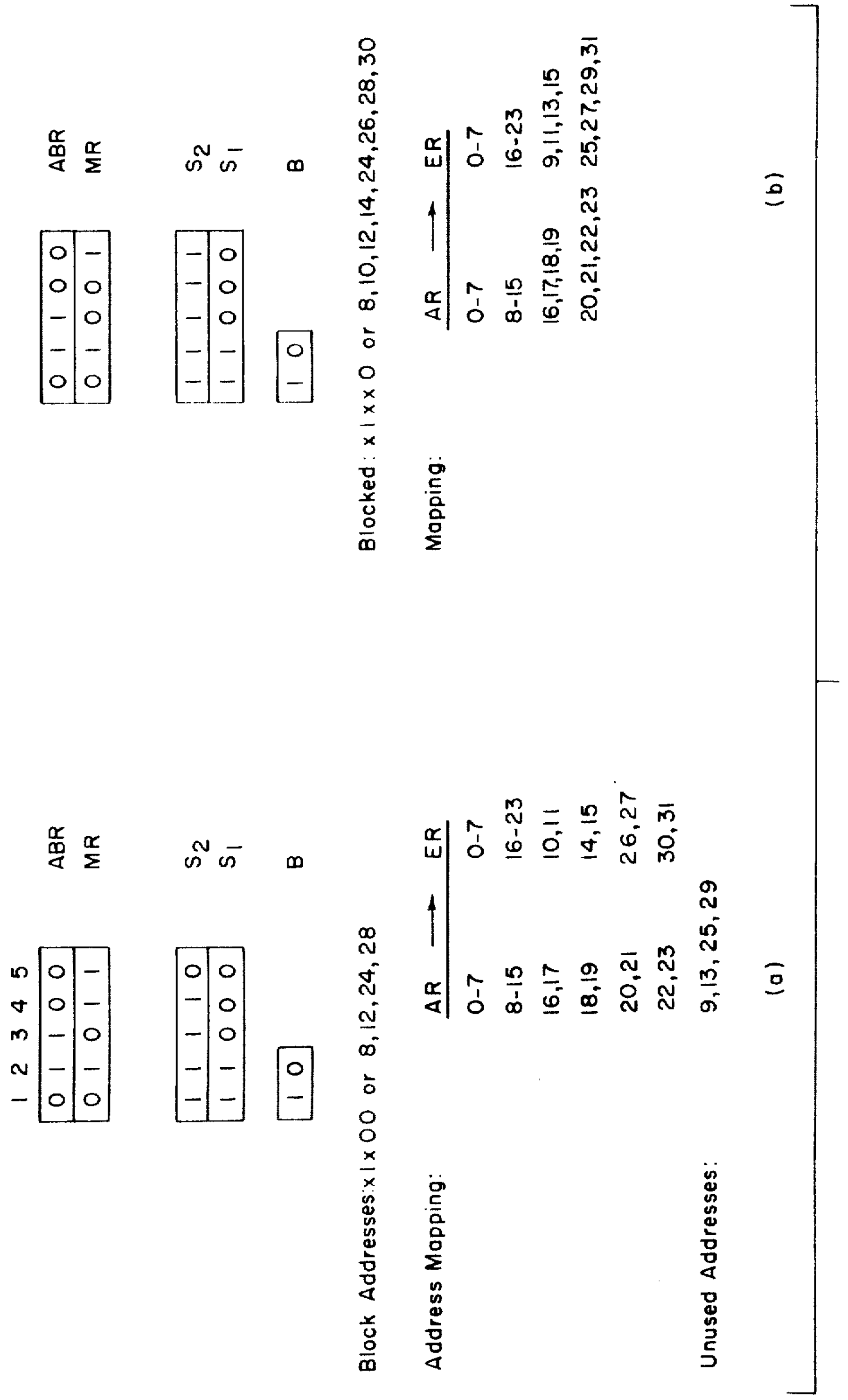
Figure 9:
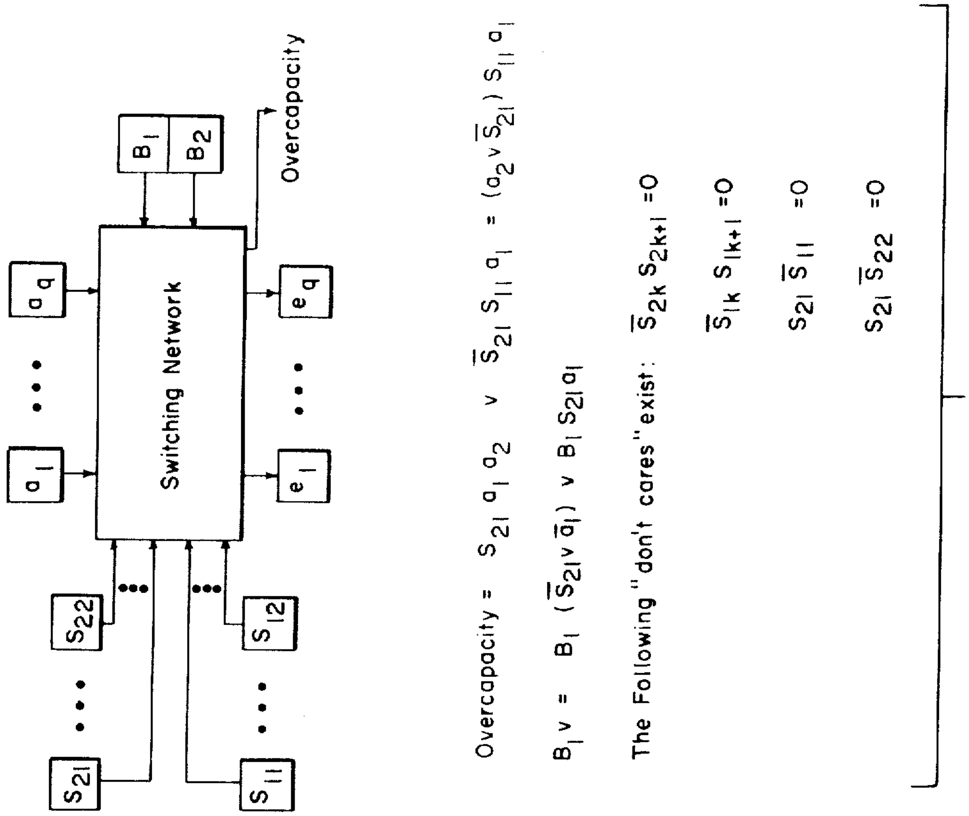
FIGS. 8 and 9 are block diagrams of switching arrangements including one and two status registers, respectively.

The example in FIG. 7 illustrates the register definition and address mapping described by this algorithm for the case $q=5$. Assume failures have been diagnosed and that ABR and MR were defined as shown in FIG. 4a in order to cover these failed locations. Assume further that only two status registers are present. The remainder of FIG. 7a illustrates the contents of the registers, the blocked locations defined by ABR and MR, the mapping of the 24 permitted input addresses, and the four good addresses unused by by the algorithm. (The reason the latter exist is because only two instead of three status registers were used.) Now assume another failure occurs at address location 14 in the BOM. Then ABR and MR are modified so as to generate the new set of registers and mapping shown in FIG. 7b. Now there are no unused good addresses since the number of 1's in MR equals the number of status registers. Again the address mapping performed by the switching network are given.

Figure 8:
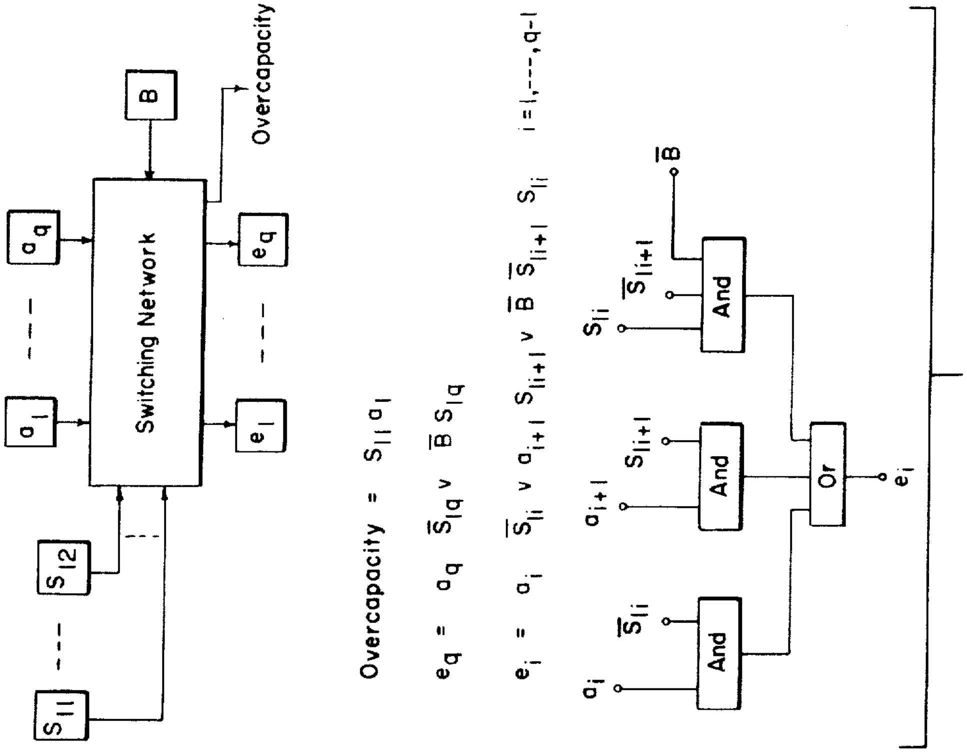
Figure 12:
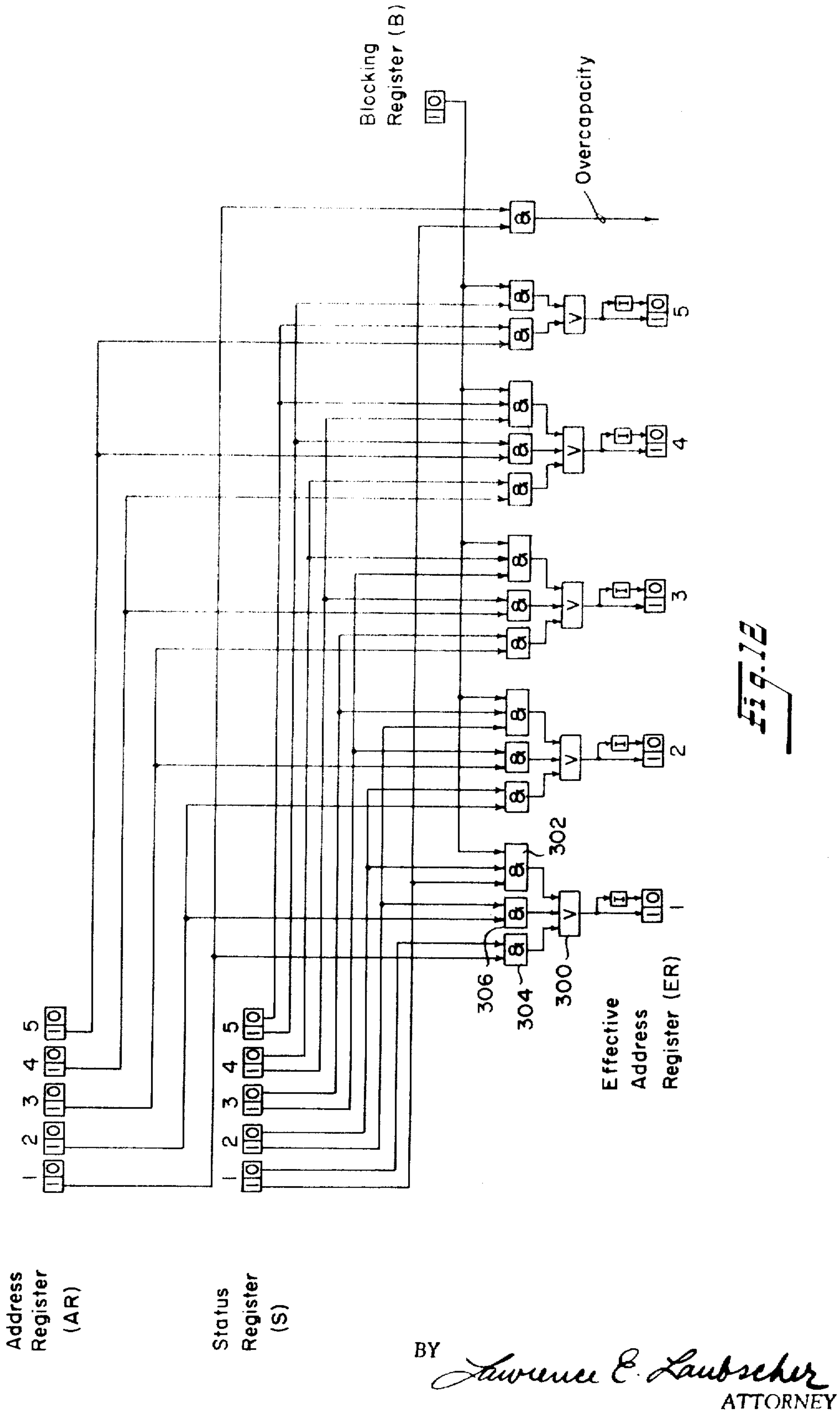
FIGS. 12 and 13 are schematic electrical diagrams of the one status register and two status register arrangements, respectively.
Figure 13:
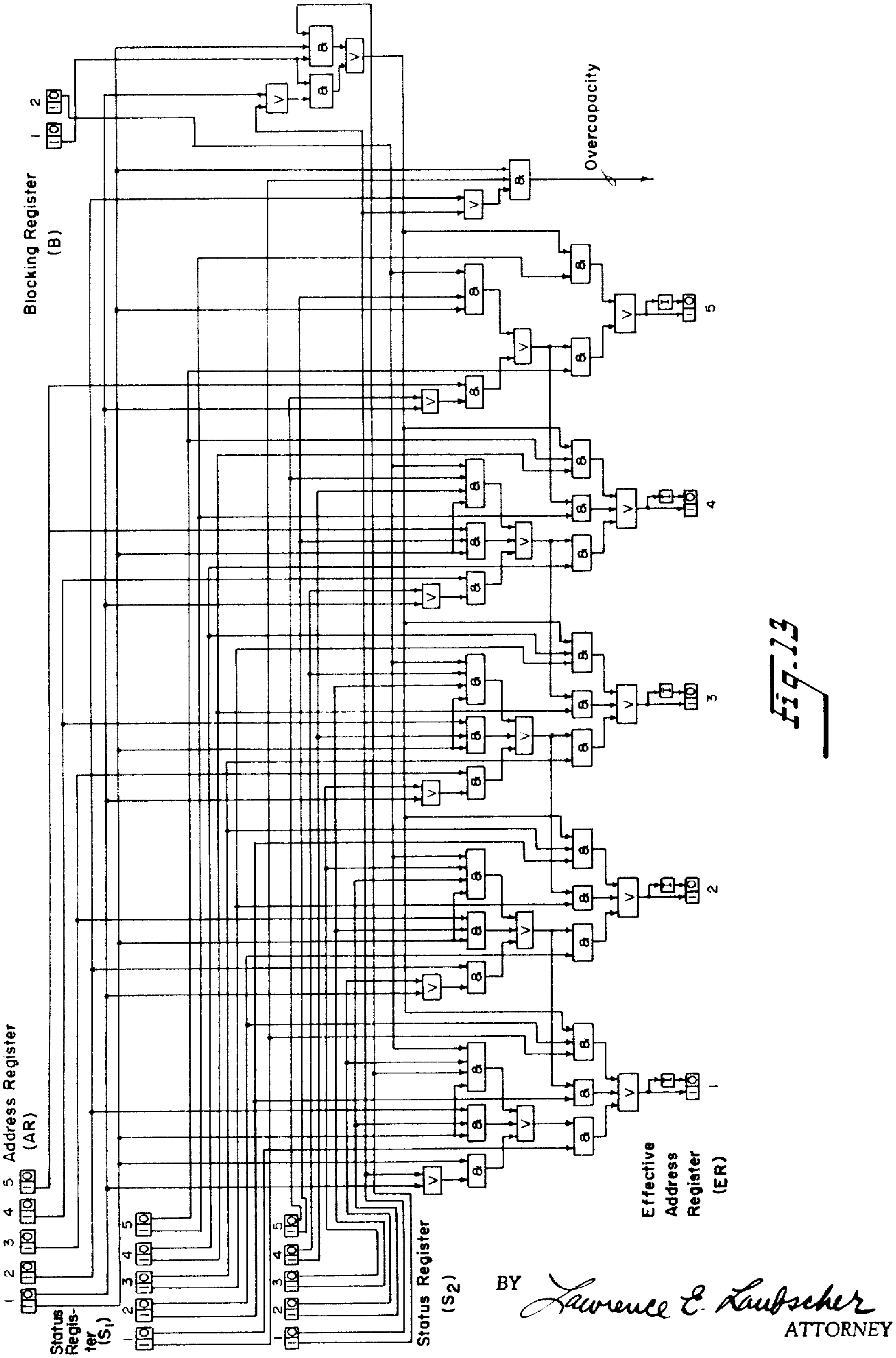

The equations describing the switching network when one status register is used are shown in FIGS. 8 and 12. A general circuit implementation for the $i^{th}$ cell of the network is also given.

Figure 10:
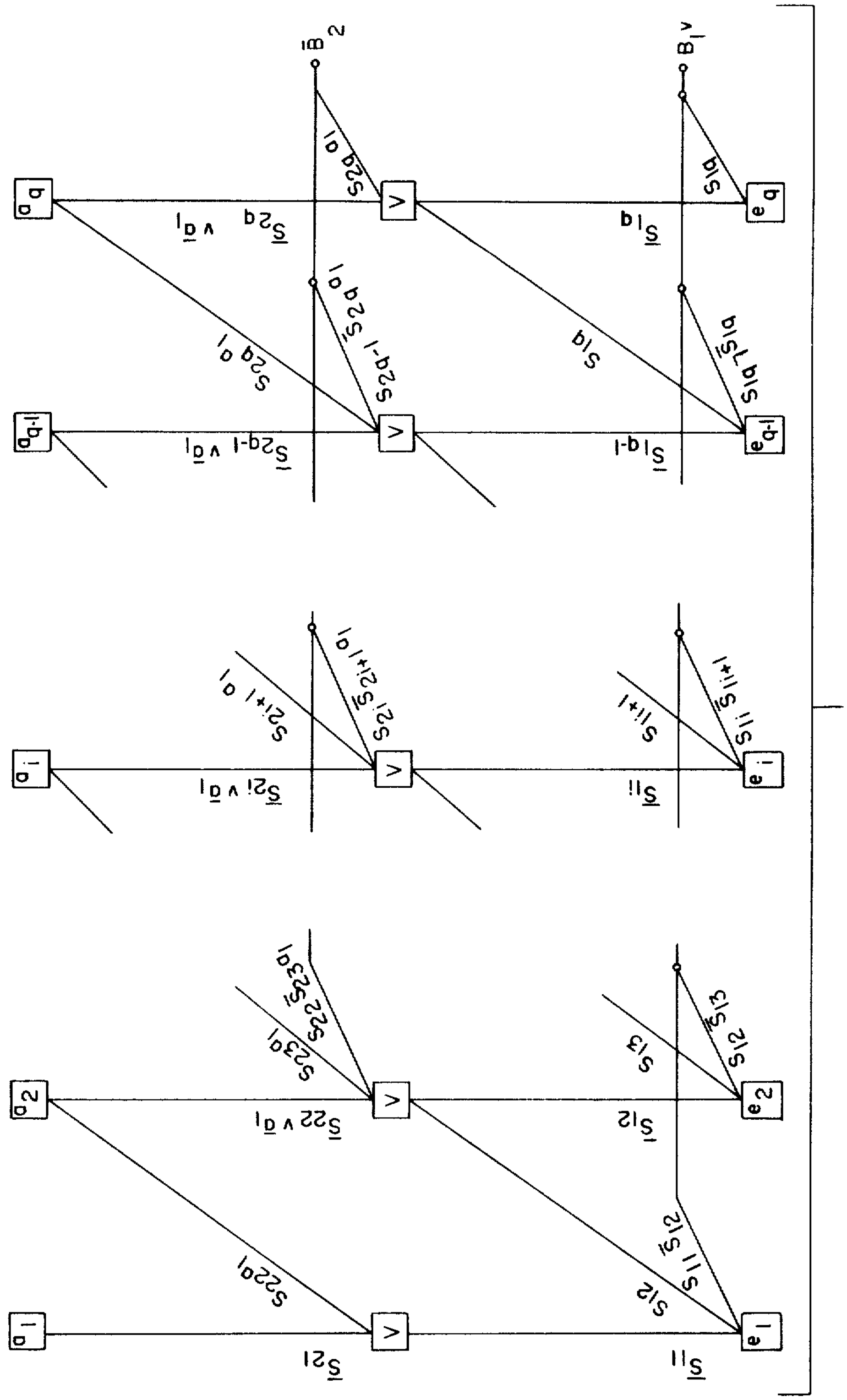
FIGS. 10 and 11 are block diagrams illustrating the switching of a two status register arrangement.
Figure 11:
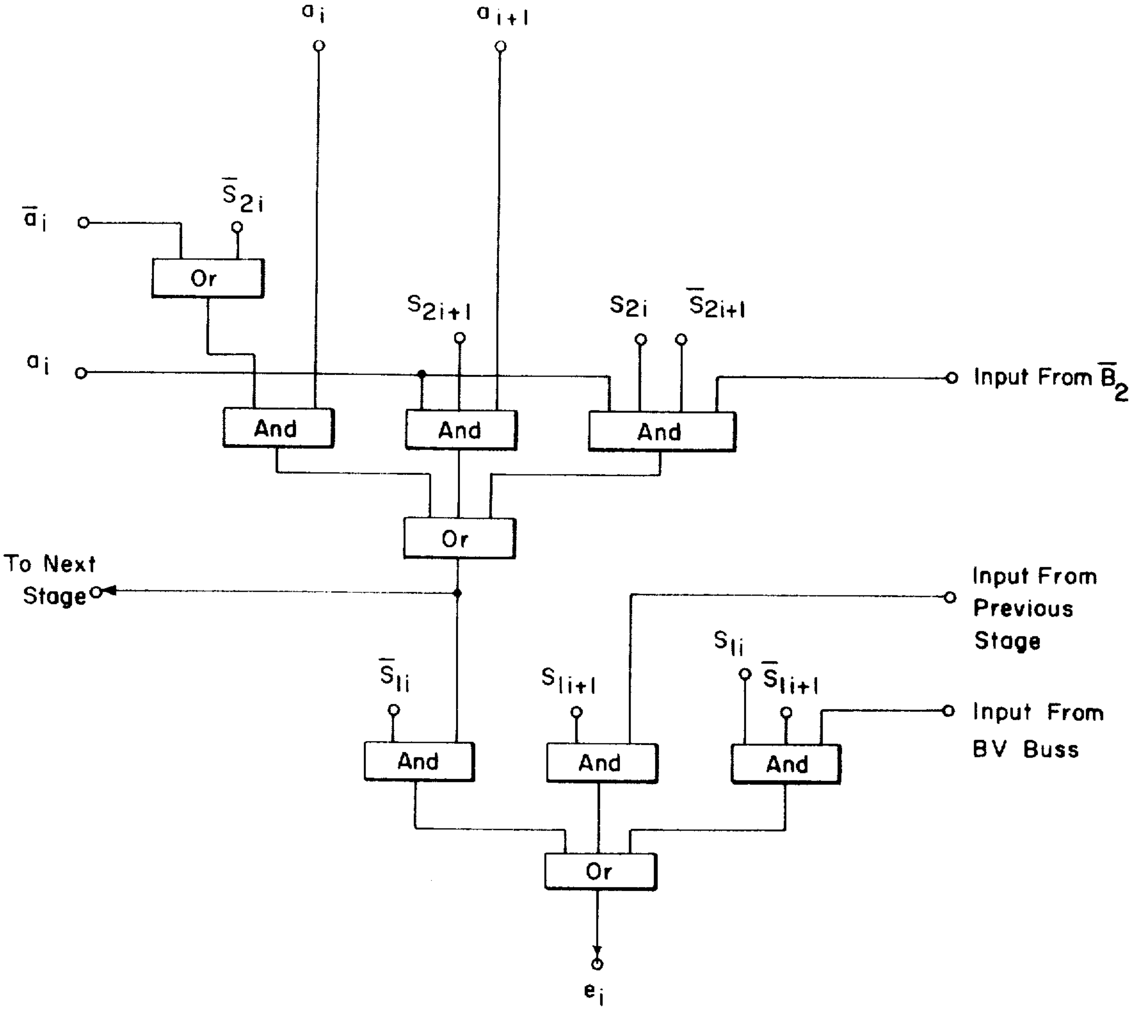

FIGS. 9–11 and 13 illustrate the structure of the switching network when two status registers are employed, which structure is easily generalized for $r>2$. The variable $B_1$ V is the value of $B_1$, either true or complemented, which is to be used in forming ER, i.e. when only $S_1$ is involved in forming ER, $B_1$ is used. When both $S_1$ and $S_2$ are involved, $\overline{B}_1$ is used. Only the first three "don't care" conditions shown in FIG. 9 were used in setting up the network description of FIG. 10. In this graphical description of the network an OR operation is performed at the nodes in the middle and bottom levels. The equations written along side each line are the conditions for gating that line value into the OR gate; i.e., each condition is ANDed with its line value. Subject to the don't care conditions, it is seen that these gating conditions at each node are disjoint. At the middle level $\overline{B}_2$ is inserted at its correct position and all lower order positions are shifted one left, as determined by $S_2$. The lower level uses $S_1$ to insert $B_1$ and leftshift all positions to the left of this point one bit. When $S_2$ is all 0 the identity transformation occurs at the middle level. Similarly $S_1$ being all 0 causes the lower level to generate the identity transformation. FIG. 11 shows a circuit implementation for the $i^{th}$ cell of the network; the two end cells do not use all the indicated AND gates.

When $r>2$ the iterative network described by FIG. 10 generalizes to one involving $r$ gating levels with $S_i$ controlling the shifting and gating of $B_i$ V into the $i^{th}$ level up from the bottom.

If a large enough fan-in and fan-out exists, it would be possible to produce a two level circuit implementation for the cell of FIG. 11. However, the delay will still be limited by the fact that $a_1$, must be used throughout the network to specify the gating conditions. Thus little gain in speed would be achieved.

The dynamic address blocking and relocation scheme described here can be combined with bit plane reconfiguration algorithm in order to produce basic operating modules which will continue to function in the presence of most failures. Such BOM's adhere to the philosophy of "graceful degradation" as the number of failures mount.

As mentioned above, the extra circuitry which was added in order to generate the effective address can be made more reliable using well known techniques, something that cannot be done to the failure prone BOM itself.

In most practical computer applications the frequency of storage failures is low enough so that reconfiguration via changing of the status registers only occurs after relatively long time periods (on the order of several days). For this reason high speed access into and out of the status registers and special circuits to compute their new states are not required; i.e. the computer itself can perform this computation (say by ROS microprogram) and feed the new state into the registers serially. If all the registers ($S_i$ and B) are viewed as one big register, a single buss line can shift the data into all register positions. This buss can then be made ultrareliable using standard multiplexing or triple modular redundancy techniques. It is also clear that MR and ABR do not have to be in high speed circuitry since they are only used indirectly. As each error is diagnosed in the addressing circuitry, their contents are updated and used as an aid in generating the correct contents of the registers $S_i$ and B.

While the invention has been particularly shown and described with reference to preferred embodiments thereof, it will be understood by those skilled in the art that the foregoing and other changes may be made therein without departing from the spirit and scope of the invention.

What is claimed is:

1. Address mapping means for achieving error toleration in the addressing circuitry of a computer system including an address register (AR) and an effective address register (ER) for transmitting address information to a basic operating module, comprising switching means connecting said address register (AR) with said effective address register (ER);

means including a blocking register (B) and at least one status register (S) for controlling said switching means to map the address bits supplied to said effective address register in a controlled manner, the number of said status registers corresponding to the number of entries in said blocking register; and means including an address blocking register (ABR) and a mask register (MR) adapted for processing a sequence of failed addresses and for inserting control instructions in said blocking and status registers to control the mapping of said switching means to dynamically exclude access to a memory area affected by faults in the addressing circuitry.

2. Apparatus as defined in claim 1, wherein each member of said sequence of failed addresses is handled one at a time as it is detected.

3. Apparatus as defined in claim 2 wherein said address blocking register (ABR) is adapted to contain the logical AND of said sequence of failed addresses, and further wherein said mask register (MR) is operable to effect comparison of only those bits of the address blocking register (ABR) that correspond with bits containing 1's in the mask register.

4. Apparatus as defined in claim 3, and further including means for inserting in said blocking register (B) the bits in the address blocking register (ABR) that correspond with those bits containing 1's in the mask register.

5. Apparatus as defined in claim 4, and further including means responsive to the introduction of the first failed address supplied to said address blocking register (ABR) for setting 1's in each of the bit positions of the mask register (MR).

6. Apparatus as defined in claim 5, wherein the number of status registers is $i$;

and further including means for inserting 1's into the $i^{th}$ status register up to and including the bit position of the $i^{th}$ 1 in said mask register, the remaining bit positions of said $i^{th}$ status register containing 0's.

7. Apparatus as defined in claim 5, wherein the number of status registers and blocking register entries is two; and further including means for setting both status registers to all 0's, means for determining the location of the first 1 in the mask register, means for setting to 1's the bit position of said status registers up to and including the location of said first one in the mask register, and means for inserting in the first entry of the blocking register ($B_1$) the bit present in the address blocking register ABR at the corresponding bit location.

8. Apparatus as defined in claim 7, and further including means for locating the position of the second "1" in said mask register, means for setting to "1's" all the bit positions in said second status register up to and including the bit position corresponding to the position of the second "1" in said mask register, the remaining positions in said second status register being 0's, and means for inserting in the second blocking register ($B_2$) the bit in said address blocking register corresponding to the position of the second "1" in said mask register.

9. Apparatus as defined in claim 5, and further including means responsive to the introduction of a subsequent failed address supplied to said address blocking register (ABR) for ANDING the subsequent failed address with the prior contents of the address blocking register (ABR).

10. Apparatus as defined in claim 9, and further including means for ANDING with the old value in the mask register (MR) the complement of the old value in the address blocking register (ABR) and the Exclusive-OR of the subsequent failed address.

11. Apparatus as defined in claim 5, and further including means for testing the contents of said mask register, comprising a plurality of normally disabled first gates (146) associated with the bits of said mask register, respectively;

mask register counter means for successively enabling said first gates, respectively;

a pair of OR circuits (152, 154) each having inputs connected with each of said first gates, respectively;

a pair of first AND circuits (202,204) each having first inputs connected with the outputs of one of said OR circuits (152);

means including an inverter circuit (210) connecting a second input of one of said AND circuits (204) with the right hand line (208) of said mask register counter, the other AND circuit (202) being directly connected with said right hand line;

a normally disabled second gate (156) having three inputs connected with the outputs of said AND circuits and the output of the other of said OR circuits (154), respectively, said second gate having three output lines that are activated, respectively, when the tested bit in the mask register is a "0" and not the right hand bit, a "1", and a "0" that is the right-hand bit; and means (CL4) for enabling said second gate.

12. Apparatus as defined in claim 11, and further including a third OR circuit (162) having a pair of inputs connected with the outputs of said pair of OR circuits, respectively; and a plurality of second AND circuits (148) having outputs connected with the bits of said status register ($S_1$), respectively, said AND circuits having first inputs connected with the output of said third OR circuit, and second inputs connected for successive actuation by said mask register counter means.

13. Apparatus as defined in claim 12, and further including a third AND circuit (160) connected between said third OR circuit (162) and said second AND circuits (148), and means (158) for enabling said third AND gate when the tested bit in the mask register is other than a 0 in the right hand bit.

14. Apparatus as defined in claim 13, and further including means for incrementing said mask register counter.

15. Apparatus as defined in claim 14, wherein said counter incrementing means includes means (CL5) responsive to a zero in the tested bit of the mask register other than the right hand bit.

16. Apparatus as defined in claim 14, and further including a second status register ($S_2$);

a plurality of fourth AND circuits (150) having outputs connected with the bits of said second status register ($S_2$), respectively, said fourth AND circuits having inputs connected with the output of said third OR circuit (162), and means connecting said fourth AND circuits for successive operation by said mask register counter means.

17. Apparatus as defined in claim 14, and further including fifth AND circuit means (166) connected between said fourth AND circuit means (150) and said third OR circuit (162), and means (164) for enabling said fifth AND circuit means when the bit being tested in the mask register is other than a 0 in the right-hand bit.

18. Apparatus as defined in claim 17, wherein said means for opening said fifth AND circuit means further includes a normally disabled third gate (170) having inputs connected with the inputs of said second gate, respectively, said third gate having three output lines that are activated, respectively, when the tested bit in the mask register is a "0" and not the right hand bit, a "1", and a "0" that is the right-hand bit;

and means (CL14) for enabling said third gate.

19. Apparatus as defined in claim 14, and further including a plurality of normally disabled fourth gate means (142) associated with said address blocking register (ABR), respectively, and successively enabled by said mask register counter means;

fourth OR circuit means having inputs connected with the outputs of said fourth gate means, respectively; a normally disabled fifth gate (174) connecting the output of said OR circuit means with the blocking register; and means (CL7) for enabling said fifth gate when a 1 is present in the bit being tested in said mask register means.

20. Apparatus as defined in claim 14, and further including

ADDF register means for receiving a failed address that is to be blocked;

first and second hold register means (HOLD 1, HOLD 2);

normally disabled sixth and seventh gate means (198, 192) for connecting the output of said hold register means with the inputs of said mask register and said address blocking register, respectively;

a plurality of sixth AND circuit means (182) having outputs connected with the inputs, respectively, of said first hold register means;

means including a normally disabled eighth gate (180) and fifth OR circuit means for connecting the bits of the address blocking register (ABR) with one input of each of said sixth AND circuit means, respectively;

means including normally disabled ninth gate means (178) and sixth OR circuit means for connecting the bits of the ADDF register with the other inputs of said sixth AND circuit means; and means (CL12, CL10, CL8) for enabling said sixth, seventh, eighth and ninth gate means.

21. Apparatus as defined in claim 20, and further including normally disabled 10th gate means (194) for connecting the bits of said mask register with said sixth OR circuit means, respectively; and means (CL 11) for enabling said tenth gate means.

22. Apparatus as defined in claim 21, and further including a plurality of Exclusive-OR circuit means (188) associated with said second hold register means (HOLD 2);

a plurality of inverter circuits (190) connecting the outputs of said Exclusive-OR circuit means with the inputs of said second hold register means, respectively;

normally disabled 11th gate means (184) connecting one of the inputs of each of said Exclusive-OR circuit means with the bits of said ADDF register, respectively;

normally disabled 12th gate means (186) connecting the other inputs of each of said Exclusive-OR means with the bits of said address blocking register (ABR) respectively; and means (CL 9) for enabling said 11th and 12th gate means, respectively.

23. Apparatus as defined in claim 22, and further including normally disabled thirteenth gate means (196) for connecting the bits of said second hold register with the fifth OR circuits, respectively.

24. Apparatus as defined in claim 4, wherein said switching means comprises a plurality of seventh OR circuits (300) the outputs of which are connected with the bits of said effective address register, respectively;

a plurality of seventh AND circuits (302) the outputs of which are connected with the inputs of said seventh OR circuits, respectively, each of said seventh AND circuits having a first input connected with said blocking register, and a second input connected with the "1" output of the corresponding flip-flop of the status register.

25. Apparatus as defined in claim 24, wherein said switching means further includes a plurality of eighth AND circuit means (304) the outputs of which are connected with said seventh OR circuit, respectively, said eighth AND circuit means including first inputs connected with the corresponding bit position of said address register, and second inputs connected with the 0 outputs of the flip-flop of the corresponding bit positions of the status register, respectively.

26. Apparatus as defined in claim 25, wherein said switching means further includes a plurality of ninth AND circuit means (306) the outputs of which are connected with the inputs of at least some of said OR circuits, respectively, said ninth AND circuit means having first and second inputs connected with the flip-flops of the next bit positions of said address and status registers, respectively.

27. Apparatus as defined in claim 26, wherein said switching means include overcapacity indicating means.

* * * * *